May 25, 1926.

J. J. MASCUCH 1,585,780

AUTOMOBILE BUMPER

Filed Sept. 23, 1925

INVENTOR.
Joseph J. Mascuch
BY
M. L. Loughridge
ATTORNEY.

Patented May 25, 1926.

1,585,780

UNITED STATES PATENT OFFICE.

JOSEPH J. MASCUCH, OF EAST ORANGE, NEW JERSEY.

AUTOMOBILE BUMPER.

Application filed September 23, 1925. Serial No. 58,159.

Figure 1:
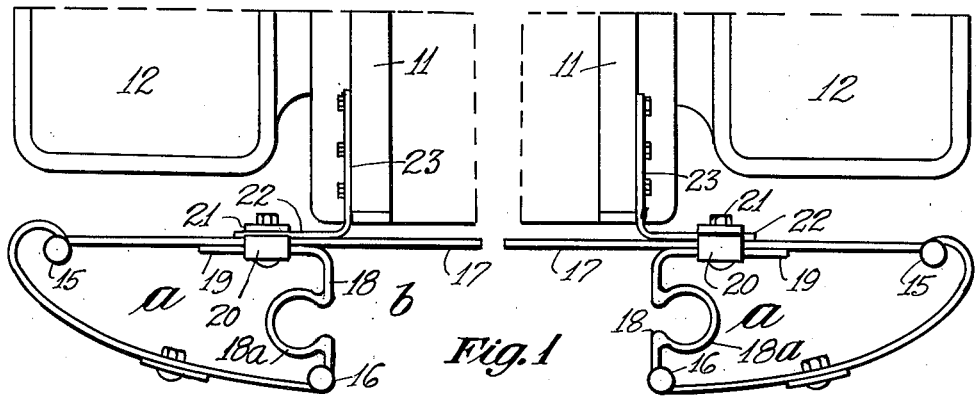
Figure 2:
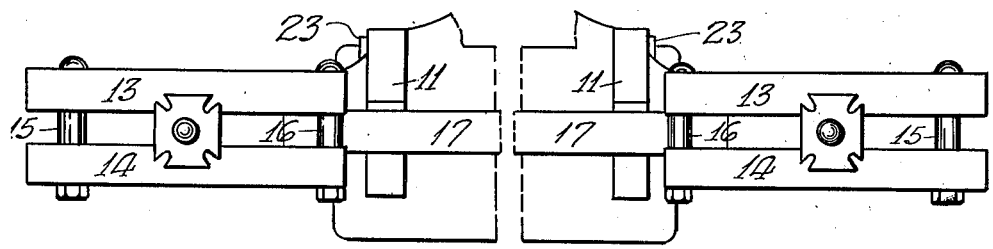
Figures 3, 4:
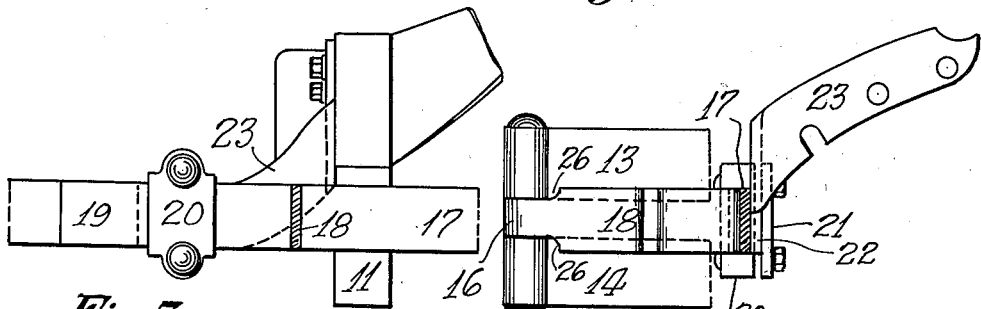

This invention relates to automobile bumpers and particularly to a type of bumper used on the rear of vehicles and has for an object to provide a bumper of this class which is resilient, able to resist heavy impacts and is comparatively low in cost of manufacture. These and other objects of the invention will be more fully understood from the following specification and the accompanying drawings, in which, Fig. 1 is a plan view of the bumper secured to the vehicle, Fig. 2 is a front elevation of the bumper looking towards the vehicle. Fig. 3 is a detail showing the rear member and the attaching bracket and Fig. 4 is a side view, partly in section showing the bumper and attaching bracket.

According to established practice automobiles carry a spare tire on the rear and this tire occupies the same plane as the bumper. The impact member of the bumper is therefore removed in the centre to provide space for the tires. In the present construction the rear member of the bumper extends across the vehicle and is supported by brackets secured to the side frame members of the vehicle. On each side arch shaped impact members are secured to protect the fenders and the rear of the car. The impact members, rear member and supporting bracket are secured by a common clamp so that the bumper is readily assembled on a car.

Referring to the drawings, 11—11 are the side frame members of the vehicle and 12—12 are the fenders. The bumper comprises a pair of similar impact members at $a$—$a$ on each side with the space $b$ between for spare tires. The impact members include the bars 13 and 14 placed parallel in vertical relation to each other and secured together by the end posts 15 and 16. The inner member of the bumper comprises the through bar 17 which connects at its extreme ends as at 15—15 to the impact bars through the end posts 15. The inner ends of the impact members are supported by an angular member 18 which connects to the end post at 16 and has the end 19 turned parallel with the through bar 17. Brackets 23 are bolted to the side frames 11 and are deflected as shown in Figs. 3 and 4 to the proper height for supporting the bumper. The end of this bracket is bent at a right angle as at 22 and lies parallel with the through member 17.

It will be noted that the parts 22, 19 and 17 are parallel and opposite each other and are securely clamped together by the clamping members 20 and 21. The bumper is symmetrical about the centre line of the vehicle, both sides being similar and having similar reference characters on the parts.

The end post construction is shown in Fig. 4 in which the rear angular member 18 which is wider than the space between the impact bars is reduced at 26 to the same width as the space between these bars and is formed into an eye which engages the end post with a pivotal connection. The same construction is provided between the rear bar 17 and the end posts 15. The bracket 23 is curved as indicated in Fig. 4 to conform to the frame members. It is bent at right angles and deflected downwards as at 22, Fig. 4 thus providing a pair of outwardly projecting arms at right angles to the frame to which the bumper is readily attached.

The impact members are formed in a loop at the outer end which, in combination with the rear bar 17, forms a closed loop which does not readily "hook" objects as the vehicle moves forward. The impact members are resilient to an impact, working on the pivot 15. In order to increase the resiliency from a direct thrust on the inner end of the impact members the angular support 18 is made resilient by the loop 18ª as shown in Fig. 1. Where resiliency is not required this loop may be omitted.

The through bar 17 acts as a protection for the rear of the vehicle, increases the rigidity of the supporting brackets and couples both parts of the bumper together.

This bumper with the supporting brackets is made from flat bar stock and is comparatively easy to form.

Having thus described my invention, I claim:

1. In an automobile bumper of the class described, the combination, a through rear bar, a pair of curved impact members comprising parallel bars secured in vertical relation by end posts, a pair of supports and a pair of brackets, the outer ends of said impact members pivotally secured to the ends of said rear bar by said end posts, the inner ends of said impact members pivotally secured to said supports by said end posts and clamps securing said brackets, rear bar and supports rigidly together.

2. In an automobile bumper of the class described, the combination, a rear bar having an eye formed in each end thereof, a pair of impact members comprising parallel bars secured in vertical relation by end posts, a pair of supports having eyes in one end and a pair of brackets, the outer end posts in said impact members engaging the eyes in said rear bar and the inner end posts engaging the eyes in said supports, the ends of said supports and brackets arranged in a plane parallel with said rear bar and clamped thereto.

3. In an automobile bumper of the class described, the combination of a rear supporting member secured to the vehicle, an impact member pivotally secured at one end to said supporting member and a member projecting perpendicularly to and supporting the opposite end of said impact member and embodying a compression spring.

Signed at New York in the county of New York this 28th day of May, 1925.

JOSEPH J. MASCUCII.